US011818127B2

(12) United States Patent
Chen et al.

(10) Patent No.: US 11,818,127 B2
(45) Date of Patent: *Nov. 14, 2023

(54) DEVICE APPLICATION ACCESS AND USER DATA MANAGEMENT

(71) Applicant: VMware, Inc., Palo Alto, CA (US)

(72) Inventors: Lucas Chen, Atlanta, GA (US); Sanjay Satagopan, Atlanta, GA (US); Raghuram Rajan, Atlanta, GA (US); Rajiv Singh, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 17/244,629

(22) Filed: Apr. 29, 2021

(65) Prior Publication Data

US 2021/0266317 A1 Aug. 26, 2021

Related U.S. Application Data

(63) Continuation of application No. 16/244,157, filed on Jan. 10, 2019, now Pat. No. 11,019,058.

(51) Int. Cl.
| | |
|---|---|
| *H04L 29/06* | (2006.01) |
| *H04L 9/40* | (2022.01) |
| *G06F 21/60* | (2013.01) |
| *H04L 9/06* | (2006.01) |
| *H04L 9/00* | (2022.01) |

(52) U.S. Cl.
CPC ........ *H04L 63/0884* (2013.01); *G06F 21/602* (2013.01); *H04L 9/0637* (2013.01); *H04L 63/0815* (2013.01); *H04L 63/0876* (2013.01); *H04L 9/50* (2022.05)

(58) Field of Classification Search
CPC ............ H04L 63/0884; H04L 63/0815; H04L 63/0876; H04L 9/0637; H04L 9/50; G06F 21/602

See application file for complete search history.

(56) References Cited

U.S. PATENT DOCUMENTS

| | | | |
|---|---|---|---|
| 8,410,898 B1 | 4/2013 | Vasquez | |
| 9,087,154 B1 | 7/2015 | Seibert, Jr. | |
| 9,985,786 B1 * | 5/2018 | Bhabbur | ............... G06F 3/0488 |
| 10,182,024 B1 * | 1/2019 | Chung | ................... H04L 51/10 |

(Continued)

*Primary Examiner* — Vance M Little
(74) *Attorney, Agent, or Firm* — Clayton, McKay & Bailey, PC

(57) ABSTRACT

Software development kit ("SDK") applications may be implemented with user data on an enterprise end-user or shared device subsequent to a single check-out process on the device. A user profile and a context ID for a user can be accessed based on user provided credentials. An agent application can set a value of an agent context ID to a server context ID corresponding to the context ID for the user profile. A status of a local context ID ("LCID") of an SDK application can be determined in response to an application launch. Using the LCD, a context ID comparison can be performed on the device with a value of a context ID from one of the SDK application, the server, and the agent application based on the LCID status. The SDK application can be implemented with user specific user data obtained from one of the SDK application and the agent application based on a result of the context ID comparison.

20 Claims, 8 Drawing Sheets

(56) References Cited

U.S. PATENT DOCUMENTS

| | | | |
|---|---|---|---|
| 2004/0186882 A1* | 9/2004 | Ting | H04L 67/306 |
| | | | 709/202 |
| 2005/0239447 A1 | 10/2005 | Holzman | |
| 2008/0209569 A1 | 8/2008 | Araki | |
| 2014/0113646 A1* | 4/2014 | Maggenti | H04L 67/04 |
| | | | 455/452.1 |
| 2014/0215587 A1 | 7/2014 | Burch | |
| 2014/0278766 A1 | 9/2014 | Dudkiewicz | |
| 2015/0020083 A1* | 1/2015 | Ben-Itzhak | G06F 9/543 |
| | | | 719/320 |
| 2015/0358331 A1* | 12/2015 | Rachalwar | G06F 21/629 |
| | | | 726/7 |
| 2016/0042388 A1 | 2/2016 | Chater | |
| 2017/0052835 A1 | 2/2017 | Cook | |
| 2017/0105171 A1 | 4/2017 | Srivastava | |
| 2018/0260393 A1 | 9/2018 | Liang | |
| 2018/0365004 A1 | 12/2018 | Chen | |
| 2019/0044940 A1 | 2/2019 | Khalil | |
| 2019/0058707 A1 | 2/2019 | Chung | |
| 2019/0068568 A1 | 2/2019 | Liderman | |
| 2020/0092332 A1 | 3/2020 | Bhattathiri | |

* cited by examiner

DEVICE APPLICATION ACCESS AND USER DATA MANAGEMENT

This application is a continuation of U.S. patent application Ser. No. 16/244,157, filed Jan. 10, 2019, and titled "DEVICE APPLICATION ACCESS AND USER DATA MANAGEMENT." This application claims benefit of priority to U.S. patent application Ser. No. 16/244,157 and incorporates it by reference herein in its entirety for all purposes.

BACKGROUND

Shared or enterprise end-user devices ("device" or "devices") managed by an entity often implement business processes performed repetitively and in the same manner by multiple employees of the entity. Each of these processes may be performed on a device through the use of a customized solution included in a software development kit ("SDK") developed for the entity. The device may be enrolled in a Mobile Device Management ("MDM") or Enterprise Mobility Management ("EMM") system, and the SDK, or individual applications implementing the SDK, can be installed, reinstalled, monitored, maintained, or otherwise managed on the device by the MDM or EMM system.

An application or a group of applications (which may be referred to as "Line of Business" ("LOB") applications) implementing an SDK may be tailored to activities most often performed by a particular group of employees that share use of the device. Each employee in a group of employees that uses the device may check out the device (by using or logging in to the device) and check in the device (by stopping use or logging out of the device) when that employee respectively begins and ends their work period. Check-in and check-out ("CICO") processes may prompt a user for credentials that are used authenticate an identity of the user ("user credentials"), and the device may include an application to manage a log-on process and user information transfer with an MDM or EMM system. The system can be configured to permit each employee in a particular organization group to access a set of applications, for example a suite of LOB applications (such as an E-signature application, mobile document, or capture application), specific to a role of the employee or group. Different group members can be granted access to more or less applications in the suite of LOB applications.

Many applications, especially LOB applications, must be able to establish a user's identity in order to surface correct information and log work under the correct user's or employee's name. It is a common issue that subsequent to an initial sign-on or check-out process with an MDM or EMM system, employees on devices must log in repeatedly to individual applications when the application is used for the first time during a work day or respective work period. This is especially the case with LOB applications, which are so intertwined with the employee's duties. This repetition hinders productivity and is often a source of frustration for users and employees.

Additionally, assigned applications may differ between subsets of employees within a particular organization group that share a device. In some cases, applications that are not common to all users in the group are installed, uninstalled, and reinstalled each time an authorized employee checks out the device. In other cases, applications may remain on the device, and even though a current user may not have access to a particular application used by a previous user, the previous user's data may remain on the device in the particular application.

As a result, a need exists for systems and methods for providing secure and efficient access to applications, particularly LOB applications, and for providing seamless employee transitions on enterprise-managed devices and shared devices. In addition, a need exists for systems and methods for securely allowing applications to change user-specific data without re-installing applications or risking unauthorized access to a previous user's information or data.

SUMMARY

Examples described herein include systems and methods for managing access to applications, including SDK-based applications. The applications can be implemented with pre-loaded user data on a device subsequent to a single sign-on ("SSO") check-out process that starts a user session on the device. In one example, a user profile and a context ID corresponding to a user can be accessed based on user credentials received from the user to check out the device. A single SDK can be used to develop multiple applications that implement the SDK and are thus SDK-based applications ("SDK applications"). An agent application can set an agent context ID ("ACID") to a server context ID ("SCID") that is obtained from a server. The SCID may correspond to the context ID for the user profile. A status of a local context ID ("LCID") of an SDK application can be determined in response to the user launching the SDK application. Using the LCID, a context ID comparison can be performed on the device with one of the SDK application, the server, and the agent application based on the status of the LCID. In one example, the SDK application can be implemented on the device with user data that is specific to the user and obtained, based on a result of the context ID comparison, from one of the SDK application and the agent application.

A device may be checked out by one of several authorized users that share the device. Each of the several users may utilize the device exclusively during a respective work period to perform that user's respective job duties. A check-out process may be implemented by an agent application and require the user to provide respective credentials. Checking out the device can enable the agent application to logon to the device locally and to a network maintained by an enterprise. The local and network logon may make available enterprise-developed SDK applications, including LOB applications, currently loaded on the device. Where the network is inaccessible, local logon may enable a user to use some SDK applications based on permissions for that particular user.

A check-out process can involve the agent application accessing and loading a user profile corresponding to user-provided user credentials. User data can encompass application permissions and user-specific data required to utilize various applications (such as user names, passwords, tokens, or certificates). The user profile may include a context ID unique to that user profile on a permanent basis or for an instant user session. Coordinated comparisons between a value of a local context ID for any SDK application (LCD), and that of an agent application (ACID) or a server (SCID), can save time for a user and computing resources for a device and network.

When launched, an SDK application can request an SCID from a server for comparison with a respective LCID, where that LCID is populated. Otherwise, the SDK application can obtain user data from an agent application and set an unpopulated LCID to an ACID. The server may have an SCID for each device that is checked out with the server. In the case of a match, the SDK application can save computing resources by decrypting self-stored user data that is specific to a current user that has checked out the device. In another example, where the LCID and SCID do not match, the SDK application can wipe user data it has stored, communicate with an agent application to obtain user data of a current user, and begin operations. Accordingly, user data for another user will not be exposed to a current user, and a time-consuming sign on process just for the SDK application can be avoided.

In yet another example, an SDK application may be one of several in a cluster of applications loaded on a device. Subsequent to an SDK application launching and requesting a context ID from a server or an agent application for comparison with a respective LCID, the SDK application can obtain user data stored in a keychain associated the cluster where the compared context IDs match. In an instance where an LCID and, as the case may be, an SCID or an ACID do not match, and the SCID or the ACID does not match a keychain context ID ("KCID"), then: user data for the keychain can be deleted; user data can be obtained from the agent application; the KCID can be set to the ACID; and the SDK application can begin operations with the correct user data.

In addition to the wiping of user data in SDK applications for a checked-out device where a local context ID does not match a context ID requested for comparison, context IDs can be used to ensure user data remains secure while a device is checked in. In one example, where a device is checked in, a request to launch an SDK application may be received. In response, the SDK application may request a context ID from a server or an agent application to compare to a respective LCD. In response to the request, the server or the agent application can notify the SDK application that the device is checked in and the SDK application can wipe stored user data in response to the notification.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for managing access to SDK applications implemented with pre-loaded user data on a device subsequent to a single sign-on check-out process that starts a user session on the device. A device may be checked out with a server by one of several users that share the device to perform respective job duties during respective work periods. The check-out process may be implemented on the device by an agent application and require the user to provide respective user credentials.

A check-out process can involve the agent application accessing and loading a user profile corresponding to user-provided user credentials. The user profile may include a context ID that is unique to that user profile either on a permanent basis for an instant user session. Coordinated comparisons between values of an LCD for any SDK application, and those of an agent application (ACID) or a server (SCID), can save time for a user and computing resources for a device and network. The comparisons can be executed in both a checked-out and checked-in state to ensure that respective user data is accessed by the correct authorized user, and removed from a device where there is a risk that an unauthorized user is attempting to utilize an SDK application.

Figure 1:
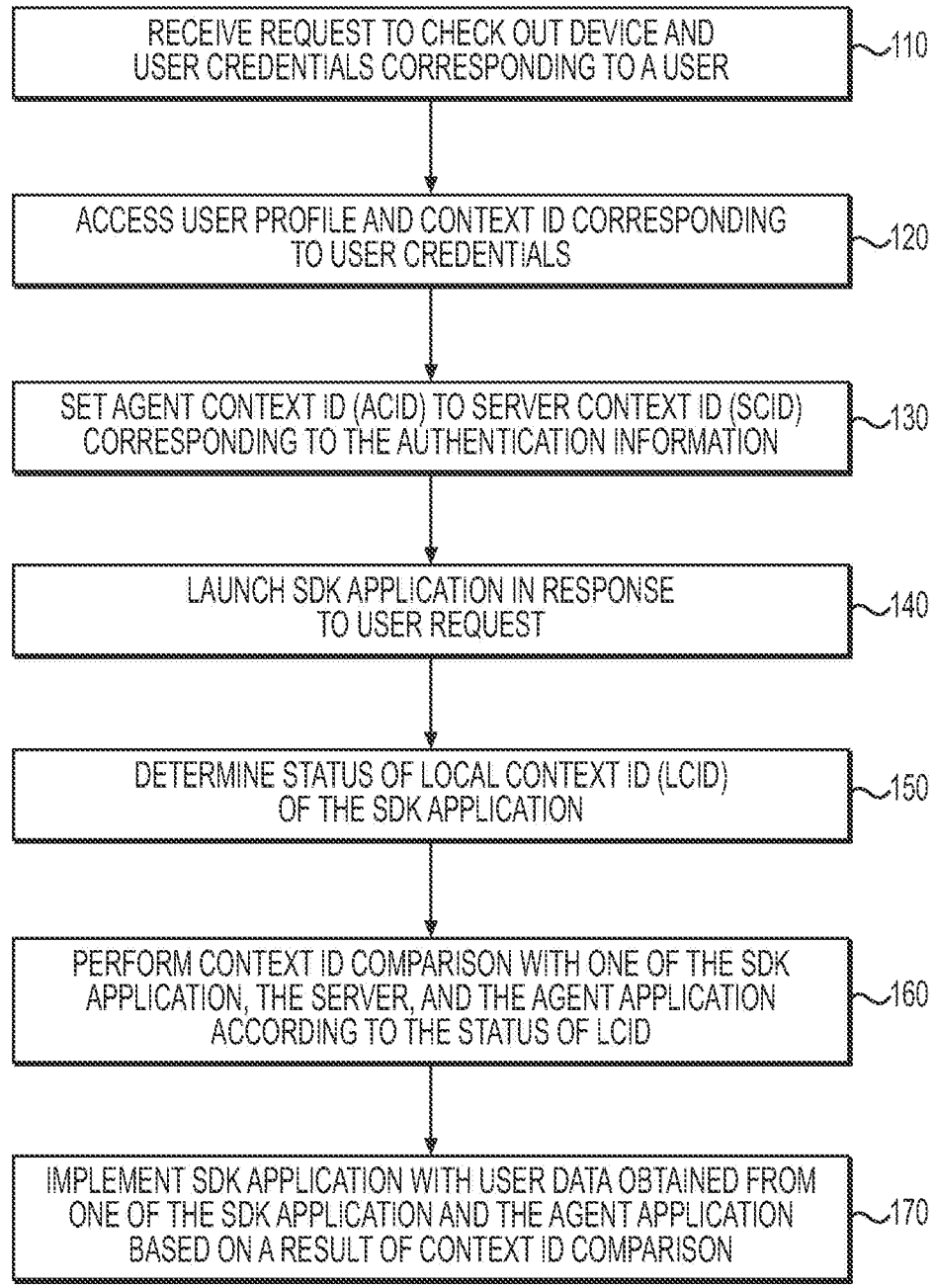
FIG. 1 is a flowchart of an exemplary method for implementing SDK applications specific to a line of business on a device.
Figure 2A:
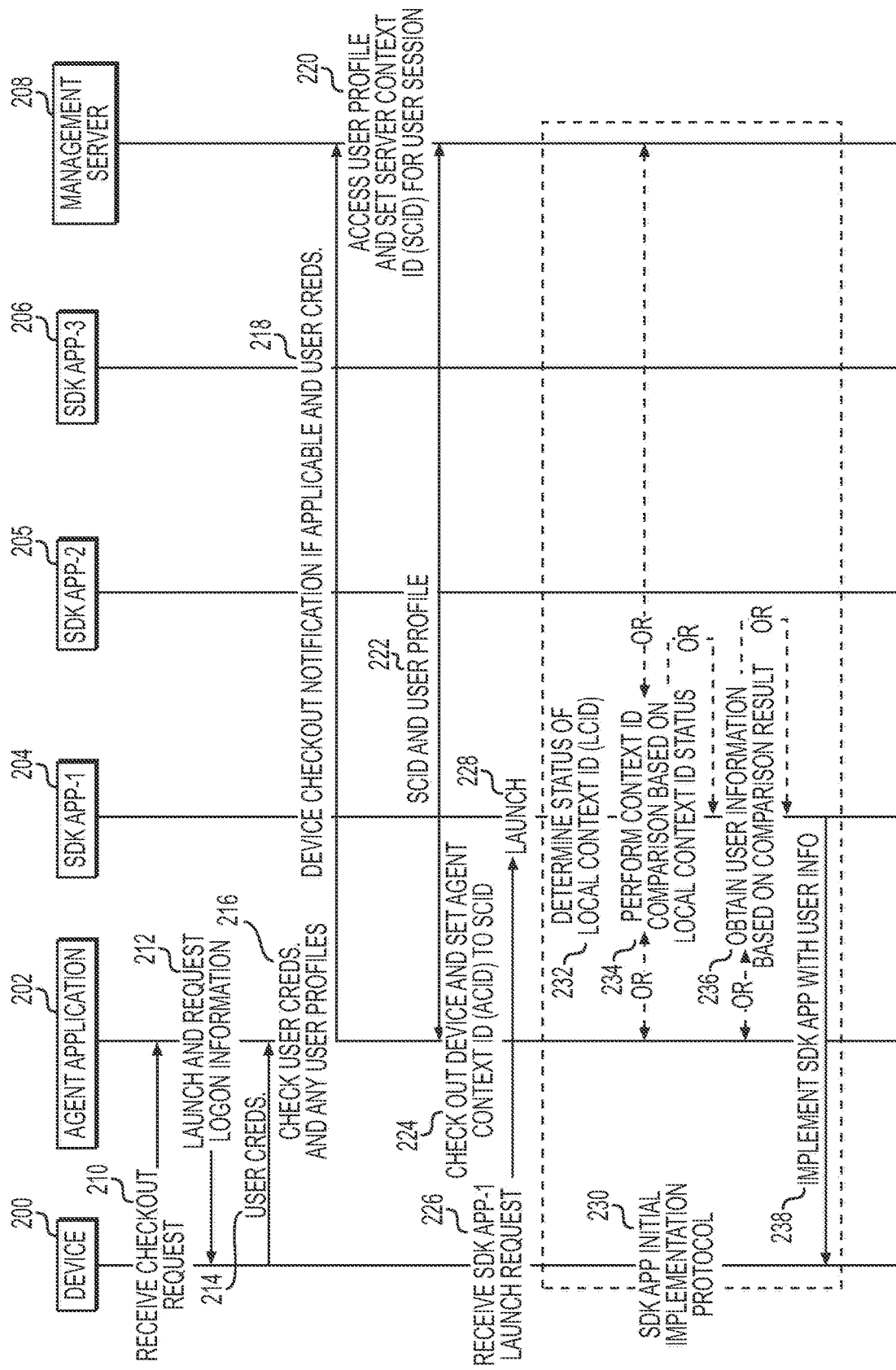
FIGS. 2A and 2B provide a sequence diagram of an exemplary method for checking out a device and launching SDK applications on the device.
Figure 2B:
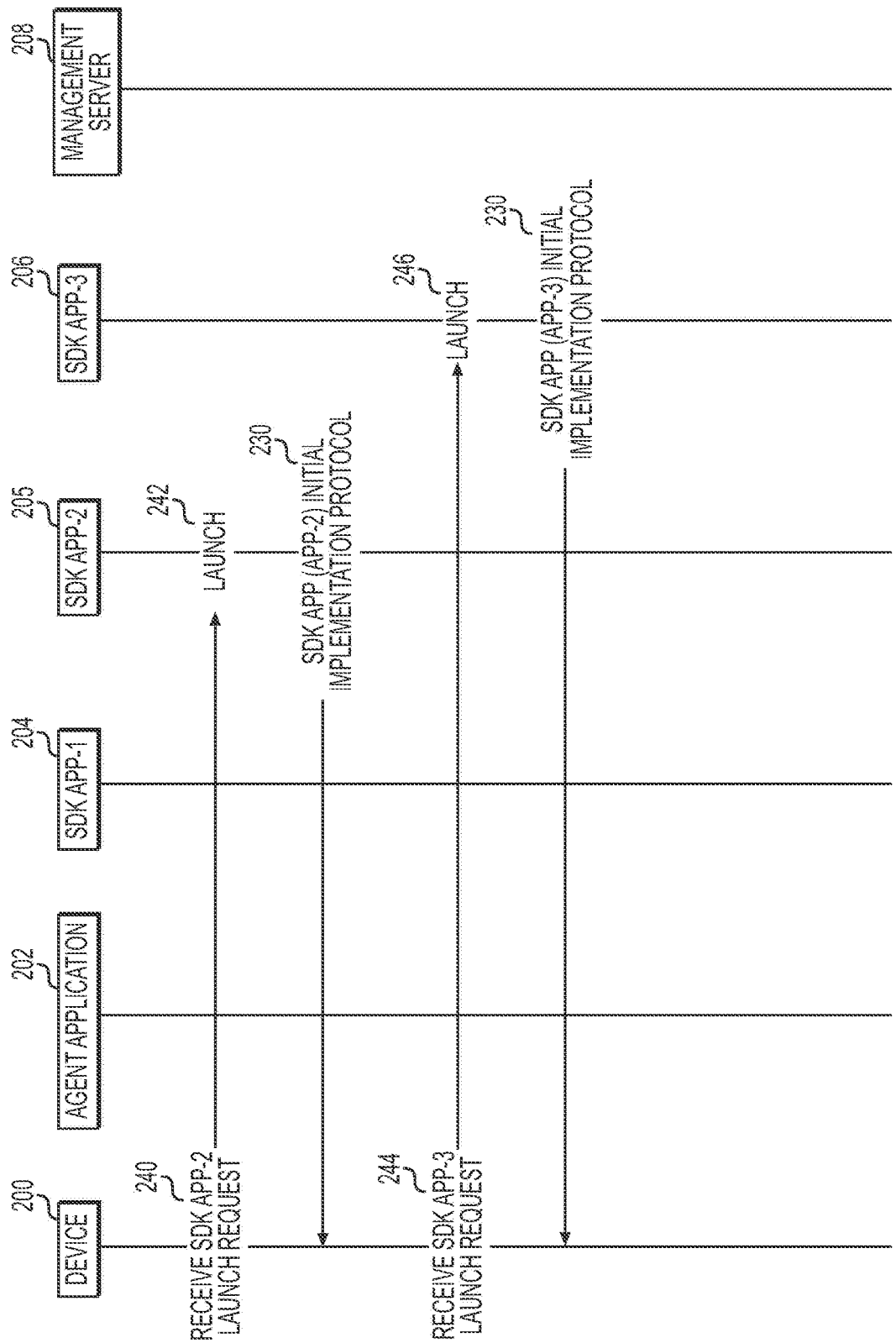
Figure 3:
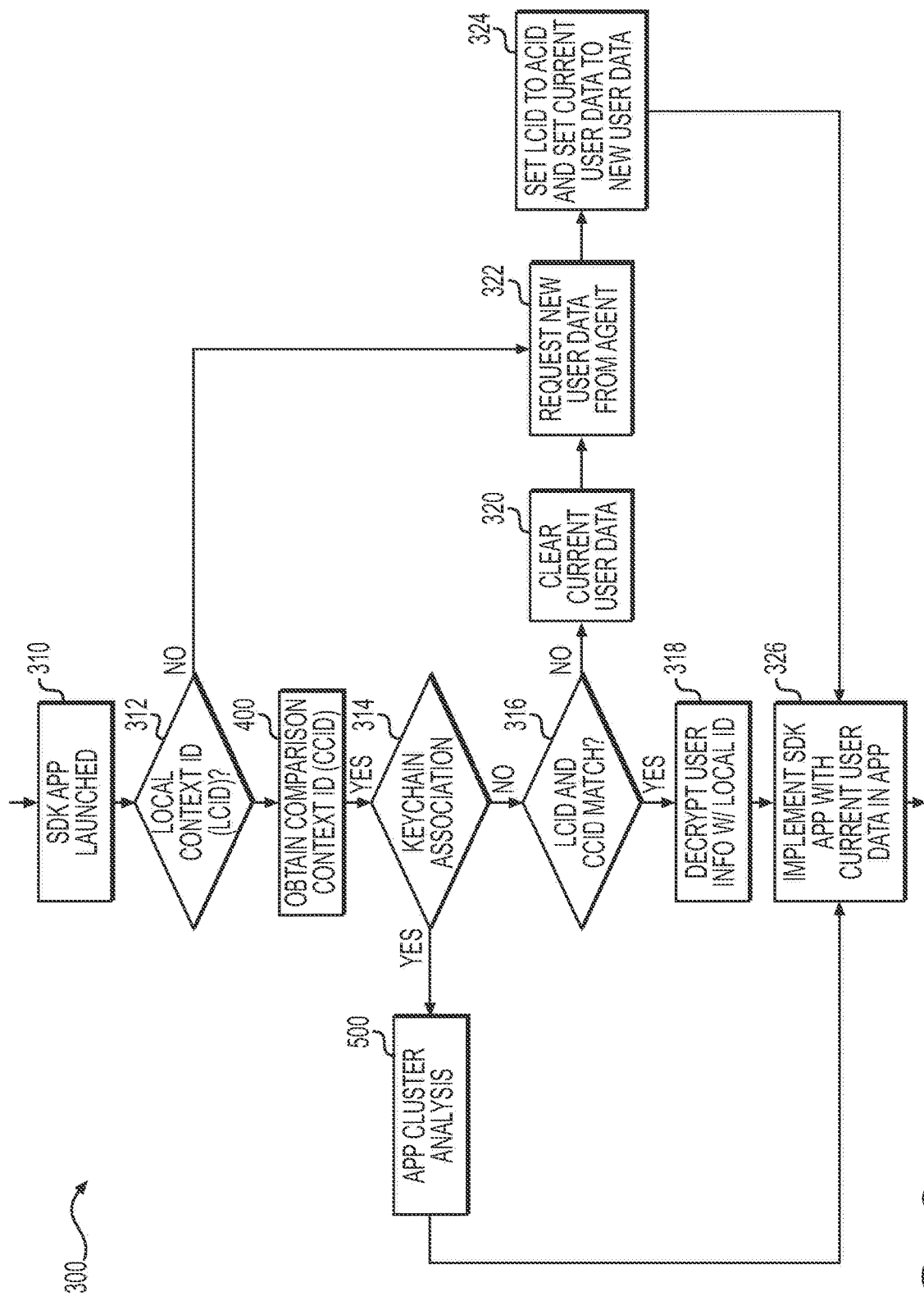
FIG. 3 illustrates an exemplary method for initially implementing an SDK application on a device.
Figure 4:
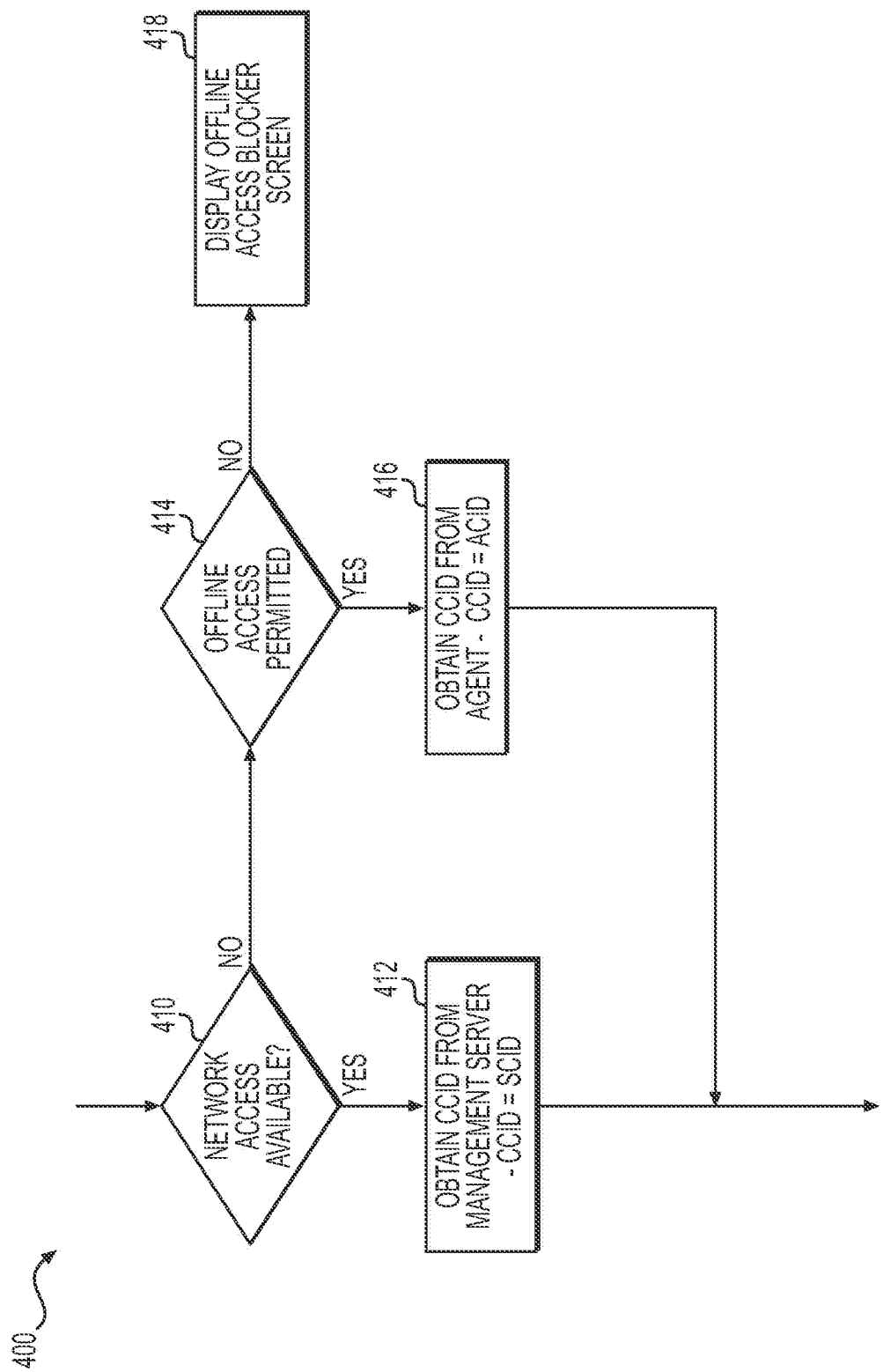
FIG. 4 illustrates an exemplary method for obtaining a comparison context ID.
Figure 5:
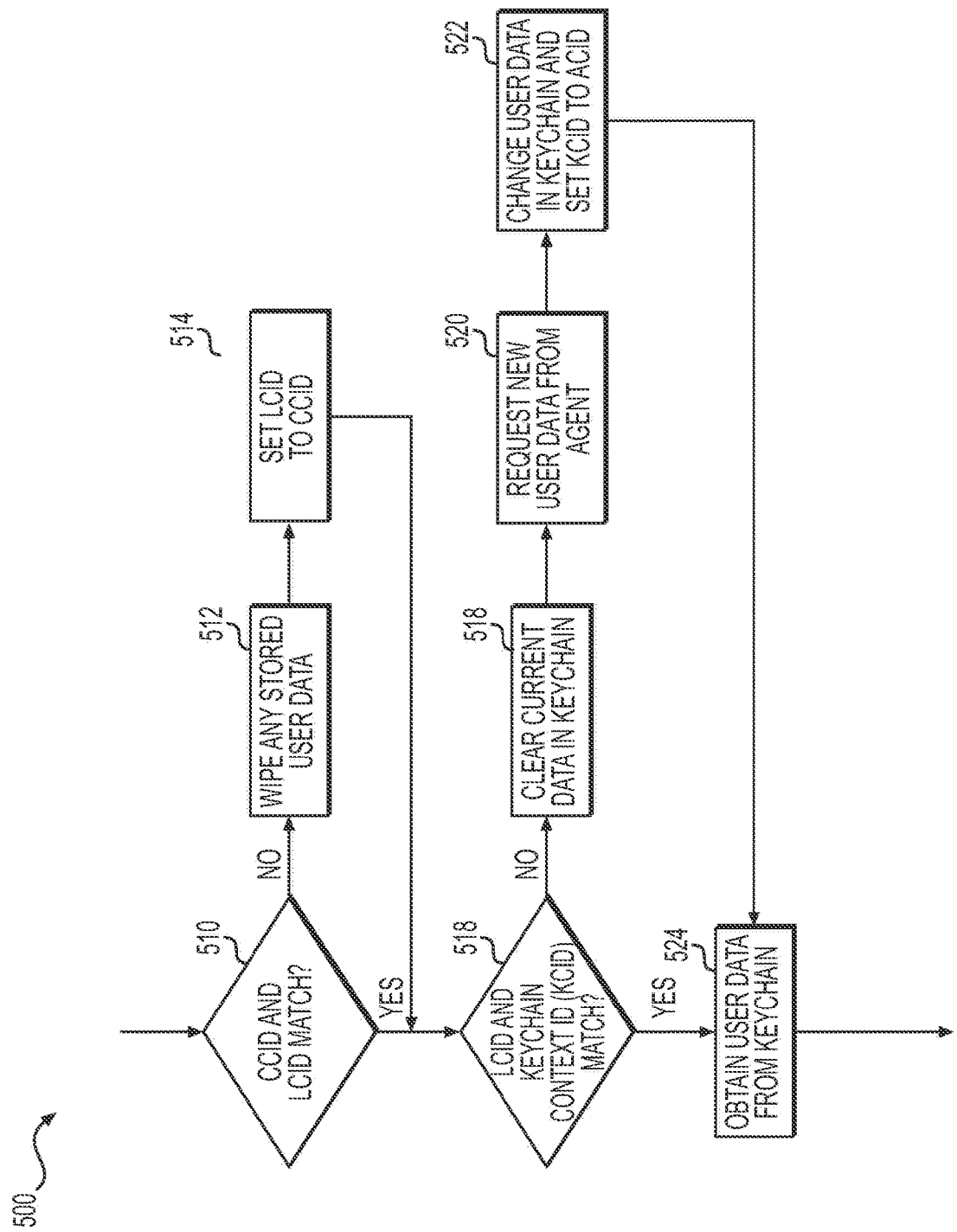
FIG. 5 illustrates an exemplary method for analyzing a local context ID of an SDK application that is part of an application cluster including a keychain.
Figure 6:
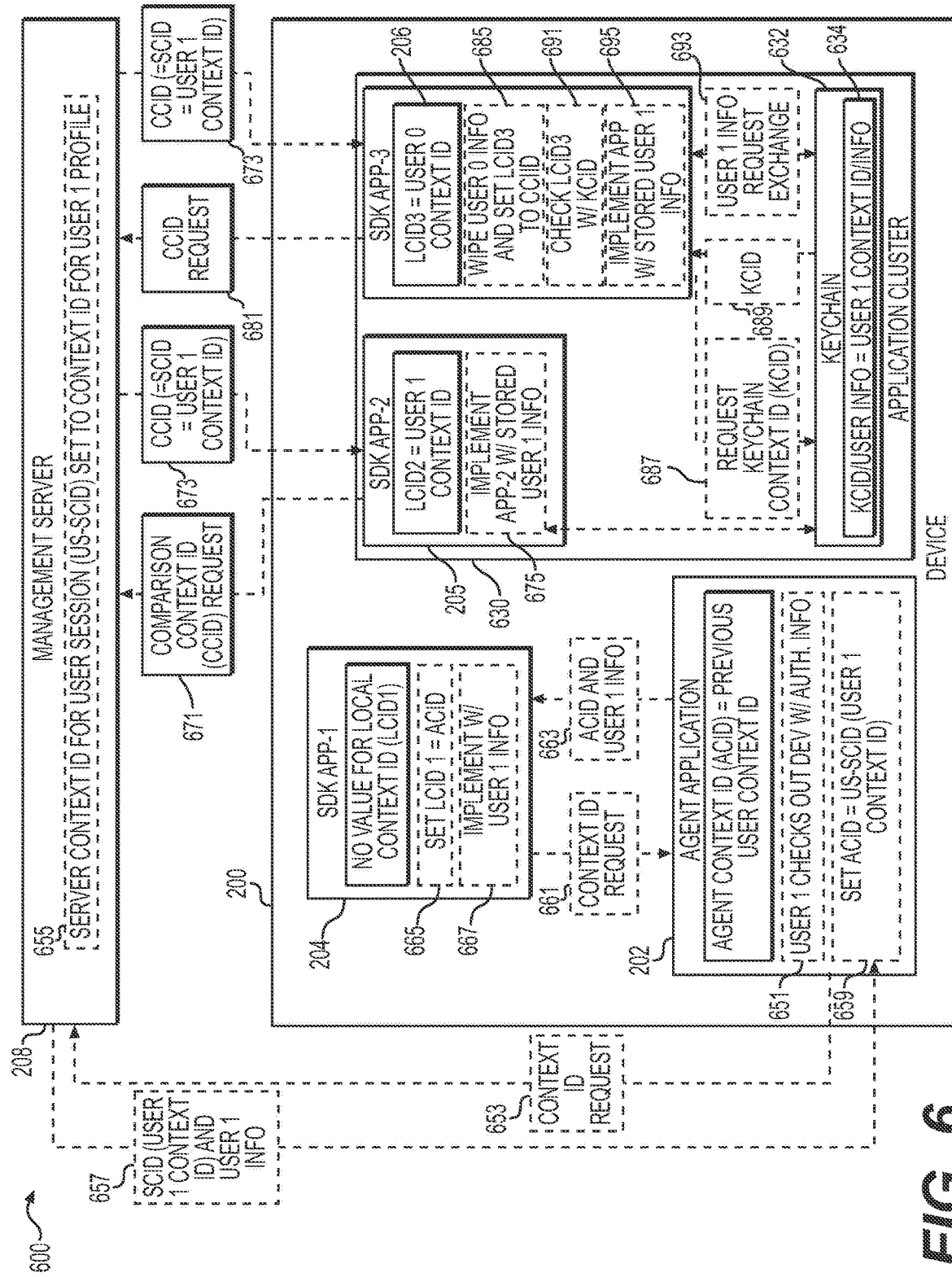
FIG. 6 is an exemplary illustration of system components for implementing SDK applications specific to a line of business on a device.
Figure 7:
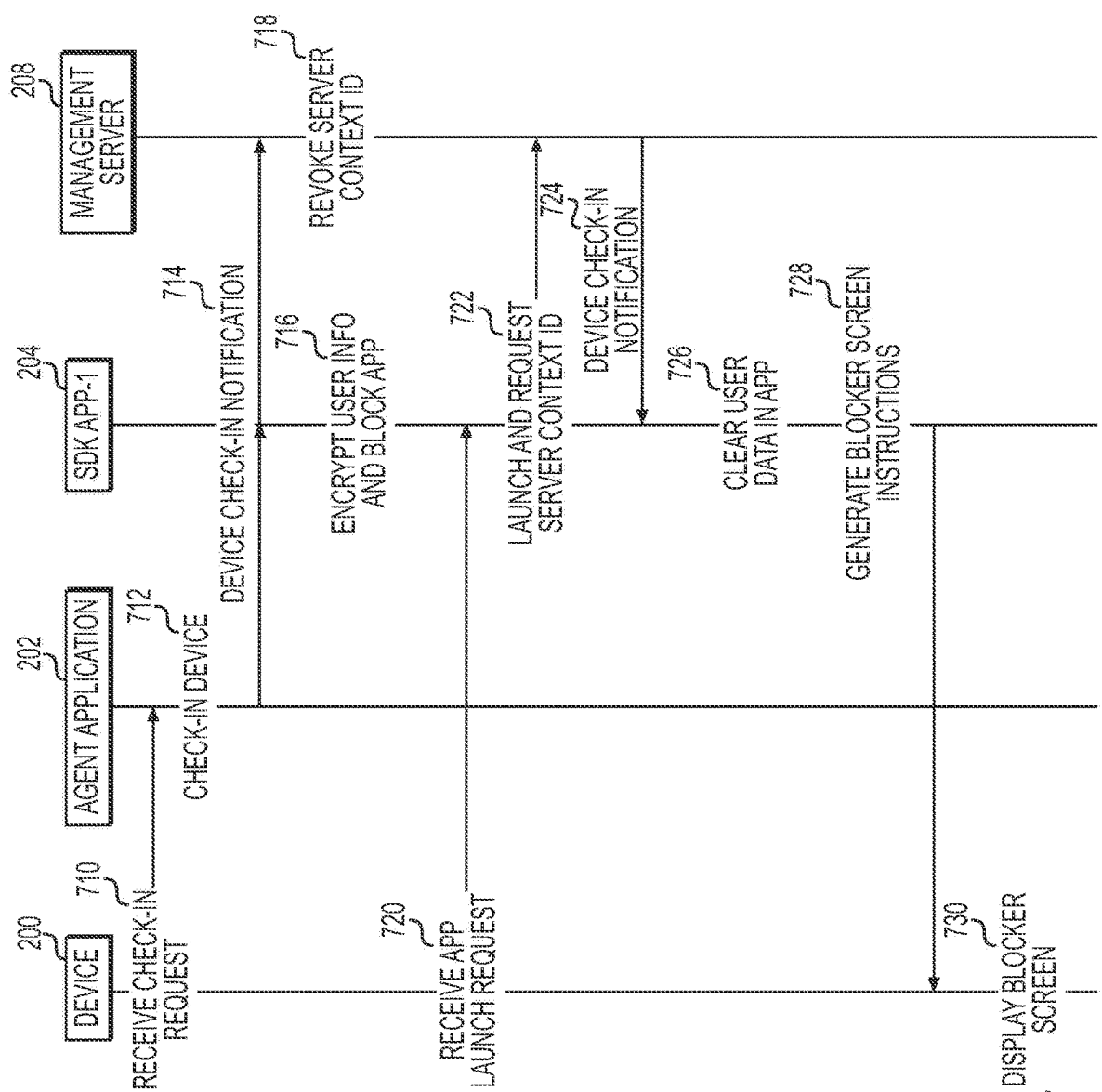
FIG. 7 is a sequence diagram of an exemplary method for checking in a device and managing user information that may be stored in an SDK application on the device.

FIG. 1 provides a flowchart of an exemplary method for implementing software development kit applications specific to a line of business on a device. FIGS. 2A and 2B provide a more detailed sequence diagram for the method of FIG. 1 that includes checking out a device and launching SDK applications on the device. FIG. 3 is a flowchart of an exemplary method for initially implementing an SDK application on a device. FIG. 4 is a flowchart of an exemplary method for obtaining a comparison context ID ("CCID") that may be implemented as part of the method of FIG. 3. FIG. 5 is a flowchart of an exemplary method for obtaining user information in one of a plurality of SDK applications associated with a keychain that may be implemented as part of the method of FIG. 3. FIG. 6 provides an illustration of exemplary system components for performing the methods of FIGS. 1-5 and 7. In addition, FIG. 7 provides a detailed sequence diagram an exemplary method for checking in a device.

Turning to the flowchart of FIG. 1, stage 110 can include receiving (A) a request to check out an enterprise-managed end-user or shared device ("device" or "devices"), and (B) credentials that can be used to authenticate an identity of the user and identify a user profile and permissions within an enterprise associated with a user ("user credentials"). The request can originate at the device based on the user attempting to unlock the device, start or launch an operating system (OS), or launch an agent application installed on the device. The device can be any computing device, such as personal computer or a workstation, or more often, a smartphone, laptop, or a tablet. The device can include a non-transitory, computer-readable medium containing instructions executed by a processor. Example non-transitory, computer-readable mediums include RAM and ROM, disks, and other memory and storage accessible by a USB port, floppy drive, CD-ROM or DVD-ROM drive, and a flash drive, among others.

Checking out the device may generally include unlocking the device and establishing a secure connection with a management server of an EMM system that the device is enrolled with. In one example, an enrollment process may include installing the agent application on the device. By being enrolled with the EMM, a constant or reproduceable trusted communication link between the management server and the device may be accessed or re-established through a logon process implemented by the agent application. Further, the management server may be able to provide instructions and requests to the agent application, which the agent application can execute at the device. In addition, the agent application can provide information about the device to the management server, including the status of any hardware or software operating on the device.

The agent application can receive the user credentials from the user as part of the logon process, for example, and exchange the information with the management server. In another example, logging in includes an exchange of user credentials that occurs with a pairing of the device with another computing device associated with a user, such as a watch, tablet, phone, or laptop. In yet another example, logging in includes bringing a device capable of near-field-communication into proximity of the device. Regardless of the particular manner, logging in as part of the check-out process can provide the agent application with sufficient user credentials to determine a user profile to request from the management server, or for the agent application to provide to the management server to determine that a particular user is currently using the device.

The agent application can be an application dedicated to management functionality, such as enforcing device-level compliance rules established at the management server. The agent application can operate on the user device in conjunction with another application that performs application-specific compliance enforcement. The agent application can be a portion of an operating system for the device. In another example the agent application can operate in an application layer of the device. For example, the agent can be a dedicated application or other software installed on the device that can monitor and manage data, software components, and hardware components associated with the device. Further, the agent application can monitor and control functionality and other managed applications on the device.

In another example, the agent application may also include the functionality of a launcher application, such as AIRWATCH LAUNCHER. This portion of the agent application can provide an interface that replaces the standard device interface, allowing an administrator to custom tailor the interface on the device for individual users or organizational groups. For example, the launcher portion of the agent application can cause the device to be locked into a single application with no access to other features or settings. As another example, the launcher portion can access whitelisted applications available to a particular user while hiding other applications from the user. The whitelist can be maintained by the agent application, for example, and an administrator can choose how to set up and administer the launcher portion of the agent application.

In one example, the request in stage 110 can be sent by the agent application to the management server. The management server can be a server, computing device, or network of multiple servers or computing devices, having one or more processors and memory stores. The management server can control access to applications or enterprise data by, for example, issuing an access token to the device that allows the device to access one or more enterprise resources. The applications can communicate directly with the management server via a network, such as the Internet. The management server can be an identity management server such as VMWARE IDENTITY MANAGER.

At stage 120, the management server can process the user credentials or the specific user profile requested from the agent application, and access a corresponding user profile. In addition, the management server can generate an SCID specific to the corresponding user profile. The management server may have an SCID for each device checked out with the management server and is in the process of implementing a user session. In one example, the SCID can be a static key or token that is permanently associated with each specific user profile stored on or accessible by the management server. In another example, the SCID can be randomly generated by the management server each time the agent application requests a user profile after verifying the user credentials, or in another example, after the user credentials is verified by the management server. In either case, once a specific user profile is identified and the SCID is generated, the management server will associate the SCID with the specific user profile. In one example, the management server can append the SCID to a default package identifier that normally identifies a specific user profile.

In providing the specific user profile to the agent application, the agent application may download a package of user information. The user information may include respective user names and passwords for SDK applications, user preferences, user-specific data such as position, level of secure data access permitted within an organization, personal information, time and sales records, compensation, and performance history and metrics.

At stage 130, the specific user profile is provided to the agent application on the device along with the SCID and the agent application can initiate a user session on the device. With the user session initiated, the device is in a checked-out state and the user may use various applications in accordance with the user profile linked to the provided user credentials.

As part of initiating the user session, the management server may instruct the agent application, or the agent application may be configured automatically to set an Agent Context ID (ACID) to the SCID provided with the specific user profile. The specific user profile can indicate which applications that a user can have access to on the device. In one example, provision of the specific user profile can cause the agent application to review the applications installed on the device, determine which applications in the specific user profile are not installed on the device, and cause the management server to provide, and the device to download and install, any missing applications.

At stage 140, the method can include the agent application launching an application that includes a compliance engine encompassed by a software package created using an SDK. A single SDK can be used to develop multiple applications ("SDK applications"). In some examples, the same SDK can be incorporated into the multiple SDK applications, while in other examples the SDK can be modified from one SDK application to the next. In one example, the SDK can be embodied as a management sub-agent that can establish and enforce privileges in managed applications installed on the device. These privileges can be specific to certain SDK applications, incorporate different operations of or be specific to functional capabilities of the shard device, and can vary for different user profiles as dictated by the management server (via an administrator).

The compliance engine can include functionality for performing compliance determinations based on various types of compliance rules, policies, and restrictions. These rules, policies, and restrictions may be established, maintained, and updated by the management server. Further, the compliance engine of the launched or any other SDK application being implemented on the device or accessible through a specific user profile, may include a code library that can be implemented by the SDK application or the agent application to perform various functions specified by the SDK. These functions may be performed as a result of the compliance determinations made by the compliance engine.

At stage 150, the launched SDK application can access and review a status of a respective LCID. In particular, the launched SDK application may determine that an LCID has a populated status, meaning it is populated with a compliant value (such as positive with respect their being value that can be compared to other context IDs), or an unpopulated status (such as there being no value or a value that cannot be compared to other context IDs). In one example, the launched SDK application may determine the LCID is unpopulated. The LCID may be unpopulated if the SDK application is being launched on the device for the first time, or the LCID was wiped after a previous user session.

Separate and apart from reviewing the status in stage 150, the LCID can be established from (set equal to a value of) the: SCID; ACID; or an LCID of another SDK application through a context ID of a keychain ("KCID"). The LCID obtains a value, or an SDK application sets a value of a respective LCID, by referring to an SCID in a case in which: the SDK is launched after the device is checked out; the LCID is populated; the device has network access; and the SDK application, in response to a query to the server, receives a context ID value corresponding to the SCID that is different from the current value of the LCID. In the case in which the device is checked out, the LCID is populated, and the device does not have network access, the SDK application may, based on a response from the agent application, set the LCID to a new value corresponding to a value of the ACID. The LCID for a first application can be set to match the LCID of a second application if, for example, the two applications are part of a cluster of applications provided by a common developer or developed based on the same SDK and the first application queries a keychain for its KCID. Accordingly, the SCID, ACID, KCID, and the LCID of any SDK application will be in the same format and include the same type of key, token, or certificate components.

At stage 160, the launched SDK application can perform a context ID comparison based on the status of a respective LCID. As explained in more detail with reference to FIGS. 2A and 2B, the SDK application can revert to the management server, the agent application, or a keychain as part of the comparison process. In particular, if the LCID is populated, and the device is connected to a network managed by or part of an enterprise infrastructure (such as an intranet), the launched SDK application can establish a connection with the management server and retrieve the SCID as a comparison context ID ("CCID").

In another example, provided a current user has certain permissions, the SDK application can revert to the agent application and the CCID can be set with a value of the ACID where the LCID is populated but the device is operating in an offline mode. As defined herein, an offline mode can include a device that is connected to the Internet but does not have access to a specific network, for example an enterprise intranet. In another example where the LCID may not be populated, the launched SDK application can notify the agent application and the agent application can direct the SDK application to set the LCID to a value matching that of the ACID.

In stage 170, the launched SDK application can obtain user data associated with the user profile corresponding to the user credentials provided in stage 110. As summarized here and explained in more detail with reference to FIGS. 3-5, how the SDK application obtains the user data can be determined in accordance with the result of the context ID comparison at stage 160.

In an example where the LCID is populated, this indicates that user data from a previous user session is currently being stored by the launched SDK application. In one example, this user data, which is linked to the context ID currently stored as the LCID, is encrypted in the launched SDK application. As previously discussed, the context ID comparison can include comparing the populated LCID to: (A) the SCID, in a case where the device is connected to the network; or (B) the ACID, in the case where the device is not connected to the network. In either of these situations, if a match is recognized, the launched SDK application will decrypt and load the user data it has stored, and the SDK application will be implemented on the device with user data for the user that checked out the device at stage 170.

In another example, user data and a value for setting the LCID may be obtained by the SDK application from the agent application where it is determined in stage 160 that LCID is not populated or does not match the CCID. In one example, this user data was loaded in the agent application after the user credentials provided in stage 110 were verified and the specific user profile was provided to the agent application in stage 120. The LCID will be set to the value of the ACID. In the case where a mismatch is recognized, user data being stored in the SDK application will be wiped in stage 170 prior to obtaining user data from the agent application.

In yet another example at stage 170, the launched SDK application may be part of an application cluster. As explained with reference to FIG. 5, after a series of comparisons that may include comparing the LCID to the SCID or the ACID, and a subsequent comparison with a KCID of the keychain, user data may be obtained from a keychain associated with the application cluster or the agent application.

In a practical application of the method of FIG. 1, a first user may work at a branch of a bank and be required to check out a shared device at the beginning of the first user's shift. To do this, the first user logs on to an enterprise network by entering a user name and password through an interface on the shared device provided by an agent application, for example. In order to perform a primary job responsibility during the shift, the first user selects a work application developed specifically for the enterprise, such as new account documentation program that captures signatures of the first user and new account holders ("document application"). The document application may store the executed documents first on the shared device, and then in a database managed by the enterprise.

The document application may require the first user to enter access credentials that must be changed on a different schedule, and thus may be different than the first user's credentials for logging on to the network. Additional user data specific to the first user may have to be loaded in the document application to correctly log work. However, due to an implementation of the method of FIG. 1 when the first user checked out the shared device, the first user will not have to spend time trying to remember, enter, or reset his or her different credentials for the document application. Further, the first user will not have to load or re-enter any user specific data required for specific functionality or activity tracking within the document application, as the document application can obtain this information with minimal computing resources from the agent application. As explained below, this is even the case where the shared device was previously checked out, and the same work application was used by a second user in a most recent user session.

In particular, when the first user checked out the shared device and began the current user session, the agent application obtained a user profile ("first user profile") associated with the first user from an enterprise server, along with a unique identifier (context ID) associated with the first user profile. The first user profile included respective user data required to access a suite of work applications including the document application selected by the first user. As a result of the selection of the document application, the document application communicated with the server to obtain a unique identifier assigned to the current user session by the server when the shared device was checked out—the same as the unique identifier for the first user profile. Upon review of the unique identifier from the server, the document application would have determined that this identifier was different from an identifier the document application had stored during the previous user session for the second user. Accordingly, the document application would have proceeded to wipe the user data being stored for the second user, and communicated with the agent application to obtain the appropriate first user data required for access and implementation.

In another example involving the first user, the first user may check in the shared device at the end of his or her shift. Subsequently, a third user who may or may not be authorized to check out the shared device, or use the document application may attempt to select the document application for use. As explained in more detail with reference to FIG. 7, the document application may indicate that it has been selected for use in a communication with the server or the agent application of the third user's request. In response, the document application may be notified that the shared device is currently checked-in and the document application will wipe user data and the unique identifier associated with the first user, which the document application is currently storing.

FIGS. 2A and 2B provide a sequence diagram of an exemplary method for launching and implementing SDK applications with user-specific information without requiring a user to complete a logon and identity-verification process for each SDK application. At stage 210, the method can include a device 200 receiving a request from a user to check out the device. The request can be communicated to an agent application 202 installed on the device 200.

At stage 212, the agent application 202 can be launched in response to the check-out request and initiate a logon process. The agent application 202 can generate an interface including entry fields for the user to enter user credentials required for the agent application 202 to check out the device 200 and log the device 200 on to a management server 208.

The method, at stage 214, can include the user credentials being received by the device 200 and provided to the agent application 202. Following receipt, the agent application 202 at stage 216 can verify the user credentials or qualify and send the credentials to the management server 208 for verification. In one example, the agent application 202 has access to stored data defining at least one specific user profile and the user credentials may be verified by the agent application 202 at stage 216. In another example, the agent application 202 may only confirm that the user credentials are in a correct format or have appropriate components, in particular when encrypted data defining a specific user profile is not currently available on the device 200.

Should the agent application 202 be able to verify provided user credentials correspond to a user profile stored with the agent application 202, given permissions associated with that user profile, the device 200 can be checked out locally by the agent application 202. In such a state, the agent application 202 can be able to check out the device 200 locally in an offline mode, and certain network-access independent functionality and applications that are normally unavailable when the device is checked in, may be made accessible to a user. In one example, where each user profile is assigned a static context ID, the data defining the specific user profile stored with the agent application 202, in a keychain for example, may include a respective context ID. Accordingly, when the device 200 is checked out locally in the offline mode, a value of the stored context ID may be used to set the ACID for a current user session.

Whether or not the device 202 can be checked out locally, the agent application 202 will qualify the user credentials and check a status of network access for the device 200 as part of stage 216. Where the device 200 is connected to the network and thus can communicate with the management server 208, the agent application 202 can transmit a notification to the management server 208 at stage 218. In one example, the notification may include the user credentials, and an indication of whether the user credentials have also been verified. In another example, where the device 200 is checked out locally at stage 216, the notification will indicate the check-out status. Additionally, the notification can include an identifier associated with the locally stored user profile. In one example, the identifier may be the ACID where each user profile is assigned a static context ID.

At stage 220, the management server 208 can verify the user credentials or process an identifier provided by the agent application 202, and access a specific user profile associated with the user credentials or the identifier. In the case of processing an identifier, such as a context ID, the management server 208 may compare user data for the user profile stored by the agent application 202 with a respectively stored user profile associated with that identifier. The management server 208 may update one or both versions of the user profile in favor of the most recent data added or changed in either version.

At stage 220, the method can include setting a server context ID (SCID) for a user session being or to be implemented on the device 200. The SCID is set for the user session from a context ID associated with a user profile for the user session that is occurring, or to be initiated, on the device 200. It should be noted that the term context ID means an identifier that may be randomly generated and include any number of binary, hexadecimal, or the like characters. The number of and type of composite elements generated for a context ID may depend on the level and type of permissions and applications assigned to a user by an administrator for an enterprise.

In one example, each user profile maintained on the management server 208 may be assigned a unique and static context ID. Such a context ID may be generated and associated with the user profile at instantiation of the user profile. In another example, the context ID may be generated and statically associated with a user profile the first time that a user session for the user profile is initiated. Associating a context ID with a user profile can include inputting the two respective values into two columns within the same row in a table, for example. In another example, associating a context ID with a user profile can include modifying the context ID or user profile to include a reference to the association.

In yet another example, ID generation can be dynamic and a new context ID could be generated at the outset of each user session for each user-specific profile. In other examples that apply to either of a static or dynamic ID generation construct, the context ID for a user profile may be generated at stage 220. For example, where the specific user profile associated with the user credentials provided in stage 214 is being accessed for the first time, or for the first time (generally with respect to the enterprise network or specifically with respect to the device 200) after the expiration of a predetermined period of time.

At stage 222, with the user profile identified and the SCID set for the user session that has been or will be initiated on the device 200, the method can include the management server 208 transmitting the user profile and the SCID to the agent application 202.

At stage 224, the method can include completing a check-out of the device 200 and setting an ACID to the value of the SCID. Where the device 200 was previously locally checked out in an offline mode in stage 216, stage 222 can include the device 200 starting an online checked-out mode of operation.

Checking out the device 200 in stage 224 may include loading the specific user profile within the agent application 202. This may include analyzing and comparing user data of the device 200 and management server 208 versions of the user profile and resolving any differences or additions (such as identifying information such as last name of user, permissions, or applications available). The agent application 202 may also communicate to the management server 208 any applications that are available to the user associated with the user profile that are not installed on the device 200. In response, the management server 208 can provide, and the agent application 202 can install, any new applications (including SDK applications).

At stage 226, the method can include receiving a request to launch a first SDK application 204 ("SDK APP-1"). In one example, an icon on the device 200 may be displayed on an interface associated with the agent application 202 or the device 200. The icon for SDK APP-1 may be made selectable when the device 200 is checked out in stage 224. In one example, SDK APP-1 may have been available in the local check out mode with limited functionality. In another example, SDK APP-1 may not have been visible or selectable in the offline checked-out mode.

At stage 228, SDK APP-1 can be lunched as part of the exemplary method. According to an advantage of the present disclosure, the user will not be prompted to enter additional user credentials in order to use SDK APP-1. Even if the user credentials for SDK APP-1 are different from those entered in stage 214 and required to check out the device 200, the user will not be required to enter this different information. This advantageous feature is a result of an execution of a series of stages that define an SDK APP initial implementation protocol 230 ("implementation protocol 230") described below.

The implementation protocol can include stages 232, 234, 236, and 238. At stage 232, SDK APP-1 can determine a status (e.g., populated or unpopulated) of a respective local context ID ("LCID1"). In one example, the LCID1 can be populated with a value as a result of a previous user session in which SDK APP-1 was implemented by a user authorized to access enterprise resources including SDK APP-1. Thus, SDK APP-1 can currently be storing (encrypted) user data that would be included in a user profile for the previous user. In another example, LCID1 may not be populated for one of several reasons previously described with respect to stage 150. In yet another example, due to unique respective security policies, SDK APP-1 may be set up to wipe all user specific and LCD data when the device 200 is checked in.

At stage 234, the implementation protocol 230 can include SDK APP-1 performing: a context ID comparison between LCID1 and a comparison context ID (CCID) having a value set from the SCID or the ACID; or a comparison between the CCID followed by a comparison with a keychain context ID (KCID). As will be evident from the explanation of FIG. 3, whether the LCID1 is compared to the CCID depends on the status of LCID1 as determined in stage 232. Further, as explained with reference to FIG. 4, a source of the CCID will depend on a network access status for the device 200.

At stage 236, the implementation protocol 230 can include obtaining user data associated with the user profile for the current user session, based on a result of the comparison, or non-comparison where LCID1 was unpopulated, in stage 234. In a case where LCID1 matches the CCID, user data stored in SDK APP-1 may be decrypted and utilized in the implementation of SDK APP-1. In one example where a match is recognized, SDK APP-1 can perform a user data comparison with user data stored with the agent application 202 to ensure that the recently decrypted user data is up to date. Where LCID1 and the CCID do not match, SDK APP-1 can communicate with the agent application 202 to obtain the ACID and user data.

In yet another example, LCID1 may first be compared to CCID and then a KCID. Where LCID1 matches the CCID and the KCID, user data may be obtained from the keychain having the KCID. In another example where LCID1 does not match the CCID, LCID1 may be set to a value of the CCID and then compared to the KCID. In the case of match for this second comparison, user data may be obtained from the keychain. Otherwise, the KCID and stored user data may be wiped and replaced through the agent application with a value of the ACID and its stored user data. In another example, the same process of wiping the keychain and reverting to the agent application 202 may be performed where LCID1 matches the CCID, but not the KCID.

At stage 238, the method can include SDK APP-1 utilizing user data obtained in stage 236 for respective operations on the device 200. Thus, the full functionality in an online mode, or an approved level of offline mode functionality, for SDK APP-1 can be available to the user that checked out the device 200 with stages 216 to 222. This will be the case even though no additional logon or other user credentials will have been requested or submitted by the user. In addition, any application configuration, preferences, or stored data specific to the operation of SDK APP-1 by the current user may be available to the user or already in use.

As illustrated in FIG. 2A, and with particular attention to the initial implementation protocol 230, the device 200 and agent application 202 only require a single credentialing/authenticating process for a user to implement an SDK application with the user's profile that includes user-specific data maintained by an enterprise management server 208. In one example, an SDK being implemented on a device can be aware that the device operates under a CICO system. When a user checks out a device, such as the device 200 in FIG. 2A, correct user data and user-specific policies for the user, which could be specific to that user's organization group, will be promulgated (such as by being loaded or accessed) on the device 200 and implemented without further user action every time the user launches a new application. Accordingly, time-consuming sign-on and other authentication processes for individual LOB applications that can reduce employee productivity are avoided.

FIG. 2B continues the detailed sequence of FIG. 2A. The device 200 may receive a request to launch a second SDK application 205 ("SDK APP-2") at stage 240. The request may occur in the same manner as the request to launch SDK APP-1. Subsequently at stage 242, SDK APP-2 may be launched on the device 200 and then the implementation protocol 230 may be executed. Specific processes executed in stages 232 to 238 will follow for SDK APP-2 based on the same criterium implemented in these stages for SDK APP-1.

However, results and processes executed for SDK APP-2 in stages 234 to 238 will flow from the evaluations performed in stages 232 and 234, and be specific to a value or non-value of SDK APP-2's local context ID ("LCID2"). This will depend on the last utilization of SDK APP-2 on the device 200, and more specifically by whom it was utilized. The same will be the case for a third SDK application ("SDK APP-3"), which the device 200 may receive a launch request for at stage 244. SDK APP-3 may be launched at stage 246 and execute the implementation protocol 230. As with SDK APP-2, processes executed for the implementation protocol 230 will depend on a value or non-value of SDK APP-3's local context ID ("LCID3")

FIG. 3 provides a flowchart of an example method for an initial implementation of an SDK application on a device. At stage 310 the SDK application can be launched. At stage 312, the SDK application can check a status (such as populated or unpopulated) of a respective local context ID (LCID). If LCID is populated with a compliant value, the SDK application can perform a process 400 ("CCID process 400") of obtaining a comparison context ID ("CCID") as described with reference to FIG. 4.

Once a CCID is obtained, the SDK application can review a respective local configuration to determine if it is associated with a keychain in stage 314. A keychain can provide controlled access to private keys and corresponding certificate chains in credential storage. In one example, a keychain can be an encrypted database that stores bits of user data including passwords, user names, personal information, and cryptographic keys and certificates that a user may manage with certificate, key, and trust services. In the event that the SDK application is associated with a keychain, the SDK application can complete a process 500 of analyzing an LCID for an application cluster ("app cluster analysis 500") as described in detail with reference to FIG. 5. Otherwise, the method can include comparing the LCD to the CCID at stage 316.

Where the CCID and the LCD match, the SDK application can decrypt user data currently stored by the SDK application in stage 318. Otherwise, the SDK application will wipe any user data it is currently storing in stage 320. This includes wiping a value for a respective LCID. It can also include wiping information specific to the user, such as profiles or other files associated with the user. Subsequent to wiping the user data, a determination in stage 312 that LCID was not populated, the SDK application may request new user data from the agent application 202. Once the new user data is received along with the ACID, in stage 324, the SDK application can load the new user data as its current user data and set the LCID to a value of the ACID.

Once the app cluster analysis process 500 is complete, or user data associated with the matched LCID is decrypted in stage 318, or new user data is loaded in stage 324, the SDK application will be implemented with the current user data in stage 326.

The combination of processes encompassed in stages 312, 316, 318, and 320 ensure that an SDK application of a device never shows a previous user's data unless the device is checked out successively by the same user. In one example, SDK applications may persist on a device, such as device 200, throughout a user session, between user sessions, and after a new user session starts after the device is checked out by a user different from a previous user. User data may remain within one or more SDK applications, but is encrypted once the device 200 is checked in. Even after a new user session begins with a device check-out, user data, if present, remains encrypted until an application is launched and a respective LCID is matched with a CCID. In the event that a comparison reveals these context IDs do not match, user data can be wiped from the applicable application.

Thus, SDK applications can remain loaded on the device and user data can remain securely but efficiently accessible for repeat check-outs by the same user. Accordingly, the methods of the present disclosure can reduce WIFI and network bandwidth usage by allowing SDK applications to change user profiles during shift changes, for example, without the need to download and re-install SDK integrated applications or data already on the device.

FIG. 4 provides a flowchart of an example process 400 for obtaining a CCID that may be incorporated with the method 300 of initially implementing an SDK application. At stage 410, the SDK application can determine if the device 200 has access to an enterprise network including the management server 208. Where a connection persists, the SDK application can communicate with the management server 208 in stage 412 and obtain the SCID for the current user session on the device 200 (which corresponds to the context ID the user profile associated with the user credentials provided in stage 214). Further, the CCID that the SDK application will reference will be set to the value of the SCID in stage 412.

On the other hand, where the device 200 is not connected to or does not have access to the network, the SDK application will determine if permissions for the current user include implementing the SDK application in an offline mode in stage 414. Where offline access and operation of the SDK application is permitted, the SDK application will obtain the ACID from the agent application 202 and set the CCID to the value of the ACID in stage 416. Otherwise, the SDK application will display a blocker screen in stage 418. More specifically, the screen displayed may inform a user that the SDK application cannot be accessed in an offline mode. Further, the blocker screen can direct the user implement an operation to obtain network access or to contact an administrator to obtain permission to access and use the SDK application in an offline mode.

The method for obtaining a CCID, as incorporated in the overall method 300 for initially implementing an SDK application, provides support for devices that implement job-critical LOB applications within specific network infrastructures but do not have intranet access. Accordingly, employees relying on LOB applications to perform many of their responsibilities can continue to perform their job functions requiring a device even if a network outage or a hardware or software issue on the device prevents network access during a user session.

FIG. 5 provides a flowchart of an example process for analyzing an LCID of an SDK application associated with a keychain. In stage 510, the SDK application can compare the LCID to the CCID. Per the CCID process 400, a value for the CCID may have been obtained from an agent application or a management server. Where the LCID and the CCID do not match, the SDK application will wipe any user data it has stored in stage 512 and set the LCID to the CCID in stage 514. Thus, by virtue of the CCD process 400, the LCID will be set from an SCID value if a device is connected to a network, or if not connected, from an ACID value.

In contrast, it may be the case that the LCID and CCID do match, as determined in stage 510. At stage 516, the process 500 can include the SDK application determining the LCID matches a keychain context ID ("KCID"). This may be a result of a user, during a current user session, using another application that is part of the application cluster. In another example, where a device has been checked out successively by the same user, the user may have used a different application of the cluster in a previous user session. Accordingly, the user's user data and context ID may be stored in the keychain from a previous usage of the different application.

In the case where the LCID and the KCID do not match, the SDK application will proceed to wipe user data in keychain and a value of the KCID in stage 518. Subsequent to the data wipe, in stage 520, the SDK application may request and receive from the agent application 202, the current user data. At stage 522, the SDK application will set the user data in the keychain to the user data provided in stage 520, and set the LCID and the KCID equal to the ACID. With the current user data stored in the keychain, the SDK application will obtain the current user data from the keychain in stage 524 for implementation in stage 326.

On the other, if a match is recognized in stage 516, the SDK application will obtain user data from the keychain in stage 524. This can indicate that the KCID and the user data was updated through an app cluster analysis process 500 executed by another SDK application during the current user session but prior to a current iteration of the process 500. In another example, the SDK application could have been one that was not utilized during a most recent user session which was also for the current user or user profile. However, another SDK application in the cluster including the currently launched SDK application may have been utilized and caused the KCID and user data to be changed to the current user's respective data.

The app cluster analysis 500 allows SDK applications to persist on a device while preventing a previous user's data from being accessed by the wrong user. It also improves processing efficiency in the event that there is a match with a KCID since the SDK application does not need to initiate intra-application communications and data transfer protocols.

FIG. 6 provides an illustration of exemplary system 600 components for performing the methods of the present disclosure. Elements of FIG. 6 that are identified with odd reference numerals and represented with dotted lines or containers represent: stages and processes being executed; and discrete information being transmitted as part of the processes. Containers with solid boundaries represent components of the system 600, or properties of those components prior to execution of the various illustrated stages or processes. These components and properties are identified with even reference numerals.

It is noted that values for reference numerals within a series of numerals associated with an SDK application in FIG. 6 (such as numerals 661, 663, and 665 that are associate with SDK APP-1), may correspond to an order in which the represented stages or processes may be executed for that SDK application. However, a first value in a series of references numerals associated with one SDK application (such as numeral 681 for SDK APP-3), relative to a first value in a series of reference numerals for another SDK application (such as numeral 661 for SDK APP-1) does not represent a strict sequence for executing one series relative to the execution of the other series. For example, the stages and processes represented by the series of numerals associated with SDK APP-2, may be performed before or after the stages and processes represented by the series of numerals associated with SDK APP-1. \

The system 600 can include a management server, such as management server 208, and a device, such as device 200, as previously described. A server incorporated as part of the management server 208 can be a computing device including one or more processors and memory storage locations. In one example, the management server 208 can implement identification, user profile maintenance, and application update services. Further, the management server 208 can provide an EMM system with which devices, such as the device 200, are enrolled. Consistent with the method illustrated in FIGS. 2A and 2B, the device 200 of the system 600 can implement: an agent application, such as agent application 202; a first SDK application, such as first SDK application 204 (SDK APP-1) and an application cluster 630 that includes a keychain 632 and second and third SDK applications, such as second and third SDK applications 205, 206, (SDK APP-2 and SDK APP-3 respectively).

As illustrated in FIG. 6, the agent application 202 can start a user session in response to receiving a checkout request 651 that includes user credentials from a user (User 1), and send the user credentials for User 1 along with a context ID request 653 to the management server 208. The management server 208 can access a user profile for User 1 in response to the context ID request 653 and set a user session server context ID 655 (US-SCID 655) to either: (A) a context ID being stored by the management server 208 and associated with the User 1 profile; or (B) a context ID generated by the management server 208 for the User 1 profile for the instant user session. Once the US-SCID 655 is established, the management server 208 will transmit a check out package 657 including the US-SCID 655 and a User 1 specific profile to the agent application 202 of the device 200.

Prior to receiving the check out package 657, an agent context ID (ACID) may have a value of a context ID associated with a user profile of a previous user session. In one example, a user for the previous user session may have been User 1 or another user. In any event, the ACID (hereafter referred to as "ACID 659") will be set to the US-SCID 655 once the check-out package 657 is received.

Initial implementation of SDK APP-1, APP-2, and APP-3 will now be described. Although not shown, it will be understood that any of the processes or discrete information performed, received, or transmitted by any of the SDK applications occur subsequent to a respective request to launch that SDK application. In response to a request to launch SDK APP-1, it will be determined that a respective context ID (LCID1) is not populated and a context ID request 661 will be transmitted to the agent application 202. The agent application 202 will transmit a first application package 663 including the ACID and user data for the User 1 profile loaded in the agent application 202. As a result, SDK APP-1 will set LCID1 to ACID at stage 665 and begin respective implementation at stage 667 with user 1 data.

Regarding SDK APP-2, as shown, a respective local context ID ("LCID2") is set to the context ID for User 1. As described, context IDs may be statically or dynamically assigned to user profiles. For the purposes of the example illustrated in FIG. 6, the system 600 statically assigns context IDs to user profiles. Accordingly, in response to receiving a comparison context ID request 671 from SDK APP-1, the CCID 673 transmitted by the management server 208 to SDK APP-2 (i.e., US-SCID 655) will be the context ID for User 1 and the same as LCID2. As a result, SDK APP-2 will send a user data request 675 to a keychain 632, receive User 1 data from the keychain 632, and initiate a respective implementation with the User 1 data. It will be noted that if SDK APP-2 was not part of the application cluster 630, the user data request 675 would involve SDK APP-2 decrypting user data that it currently stores.

Turning to SDK APP-3, as shown, a respective local context ID ("LCID3") is set to the context ID for User 0. When launched, SDK APP-3 will transmit a CCID request 681 to the management server 208, which will respond by transmitting CCID 673 (US-SCID 655). At stage 685, SDK APP-3: (1) determines that CCID 673 and LCID3 do not match; (2) completes a context ID and user data wipe; and (3) sets LCID3 to CCID (US-SCID 655/User 1 Context ID). Subsequent to the completion of stage 685, SDK APP-3 will transmit a keychain context ID (KCID) request 687 to the keychain 632. As previously noted, the keychain 632 includes the context ID and user data for User 1. Accordingly, when SDK APP-3 receives KCID 689, it will be determined at stage 695 that LCID3 and KCID are the same, and SDK APP-3 will transmit a user data request 693 to the keychain 632. Upon receipt of the User 1 user data, SDK APP-3 will initiate a respective implementation with the User 1 user data.

FIG. 7 illustrates a sequence for checking in a device according to an aspect of the present disclosure. At stage 710, the device 200 may receive a request to be checked-in and thus end a current user session. The request may be entered into an interface of the agent application 202 or another interface of the device 200 at stage 710, and in response, the agent application 202 can check in the device 200 at stage 712. At stage 714, the agent application 202 can notify the management server 208 and SDK APP-1 that the device 200 has been checked-in. In one example, the agent application 202 can broadcast the check-in to all the SDK applications on the device 200. In addition to SDK APP-1 and other applications, the agent application 202 can notify the management server 208 of the check in at stage 714. As a result, SDK APP-1 can encrypt user data it is currently storing and present a blocker scree in stage 716. Further, the management server 208 can revoke an SCID for the user session at stage 718. The processes in stage 716 and 718 can be executed in any order and independently of the other.

While the device 200 is checked in, a request to launch SDK APP-1 or another SDK application can be received at stage 720. In response, SDK APP-1 can launch and request the SCID from the management server 208 at stage 722. In response, the management server 208 can send a notification at stage 724 informing SDK APP-1 of the check-in status of the device 200 and instruct SDK APP-1 to wipe any and all user data that is currently being stored and a value of a respective local context ID (LCID1). At stage 726, the method can include SDK APP-1 completing a user data and context ID wipe. In one example, where SDK APP-1 is one application in a cluster of applications, the method at stage 726 can additionally include completing a wipe of user data in a keychain associated with SDK APP-1, as well as a respective KCID. In another example, the user data and KCID in the keychain may not be wiped. Upon completion of the wipe in stage 726, SDK APP-1 can generate a blocker screen instruction at stage 728 and the device 200 can implement the instructions and display the blocker screen at stage 730.

As shown with sequence diagram of FIG. 7, an SDK being implemented on an enterprise end user or a device, such as device 200, can be configured to recognize when the device 200 is in a staging mode, otherwise known as a period of time between user sessions/device checkouts. The device 200 will not provide access to an old user's data, especially in the case where the device 200 is not checked out. In the case of an enterprise owned, managed, and device, non-authorized users are blocked from enterprise applications and that employ propriety processes and can store specific employee data.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for managing access to applications on a user device, comprising:
   receiving, at a management server from an agent executing on the user device, user credentials and an indication of whether the user credentials have been verified;
   retrieving a user profile associated with the user credentials;
   setting a server context ID for a user session; and
   transmitting the user profile and the server context ID to the agent, wherein the agent:
      checks out the device to the user by:
         loading the user profile; and
         setting an agent context ID to the value of the server context ID;
      launches an application on the user device;
      determines a status of a local context ID of the application; and
      in an instance where the local context ID matches at least one of the agent context ID and server context ID, implements the application with user data specific to the user.

2. The method of claim 1, wherein receiving the user credentials and the indication further comprises receiving an indication that the device is checked out locally.

3. The method of claim 1, wherein receiving the user credentials and the indication further comprises receiving an identifier associated with a locally stored user profile.

4. The method of claim 1, wherein the management server receives an indication of applications available to the user based on the user profile but not installed on the user device.

5. The method of claim 1, wherein loading the user profile comprises the updating a locally stored version of the user profile to match the user profile received from the management server.

6. The method of claim 1, wherein checking out the user device comprises displaying an icon associated with the application on the user device to indicate that it is available to the user.

7. The method of claim 1, the method further comprising:
sending a keychain context ID to the agent; and
causing the agent to compare the keychain context ID to the local context ID and, in an instance where the comparison results in a match, provide user data from the keychain to the application.

8. A non-transitory, computer-readable medium comprising instructions that, when executed a hardware-based processor, perform stages for managing access to applications on a user device, the stages comprising:
receiving, at a management server from an agent executing on the user device, user credentials and an indication of whether the user credentials have been verified;
retrieving a user profile associated with the user credentials;
setting a server context ID for a user session; and
transmitting the user profile and the server context ID to the agent, wherein the agent:
checks out the device to the user by:
loading the user profile; and
setting an agent context ID to the value of the server context ID;
launches an application on the user device;
determines a status of a local context ID of the application; and
in an instance where the local context ID matches at least one of the agent context ID and server context ID, implements the application with user data specific to the user.

9. The non-transitory, computer-readable medium of claim 8, wherein receiving the user credentials and the indication further comprises receiving an indication that the device is checked out locally.

10. The non-transitory, computer-readable medium of claim 8, wherein receiving the user credentials and the indication further comprises receiving an identifier associated with a locally stored user profile.

11. The non-transitory, computer-readable medium of claim 8, wherein the management server receives an indication of applications available to the user based on the user profile but not installed on the user device.

12. The non-transitory, computer-readable medium of claim 8, wherein loading the user profile comprises the updating a locally stored version of the user profile to match the user profile received from the management server.

13. The non-transitory, computer-readable medium of claim 8, wherein checking out the user device comprises displaying an icon associated with the application on the user device to indicate that it is available to the user.

14. The non-transitory, computer-readable medium of claim 8, the stages further comprising:
sending a keychain context ID to the agent; and
causing the agent to compare the keychain context ID to the local context ID and, in an instance where the comparison results in a match, provide user data from the keychain to the application.

15. A system for managing access to applications on a user device, the system comprising:
a management server having a memory storage storing a non-transitory, computer-readable medium comprising instructions;
a hardware-based process that executes the instructions to carry out stages comprising:
receiving, at a management server from an agent executing on the user device, user credentials and an indication of whether the user credentials have been verified;
retrieving a user profile associated with the user credentials;
setting a server context ID for a user session; and
transmitting the user profile and the server context ID to the agent, wherein the agent:
checks out the device to the user by:
loading the user profile; and
setting an agent context ID to the value of the server context ID;
launches an application on the user device;
determines a status of a local context ID of the application; and
in an instance where the local context ID matches at least one of the agent context ID and server context ID, implements the application with user data specific to the user.

16. The system of claim 15, wherein receiving the user credentials and the indication further comprises receiving an indication that the device is checked out locally.

17. The system of claim 15, wherein receiving the user credentials and the indication further comprises receiving an identifier associated with a locally stored user profile.

18. The system of claim 15, wherein the management server receives an indication of applications available to the user based on the user profile but not installed on the user device.

19. The system of claim 15, wherein loading the user profile comprises the updating a locally stored version of the user profile to match the user profile received from the management server.

20. The system of claim 15, the stages further comprising:
sending a keychain context ID to the agent; and
causing the agent to compare the keychain context ID to the local context ID and, in an instance where the comparison results in a match, provide user data from the keychain to the application.

\* \* \* \* \*